Figure 1:
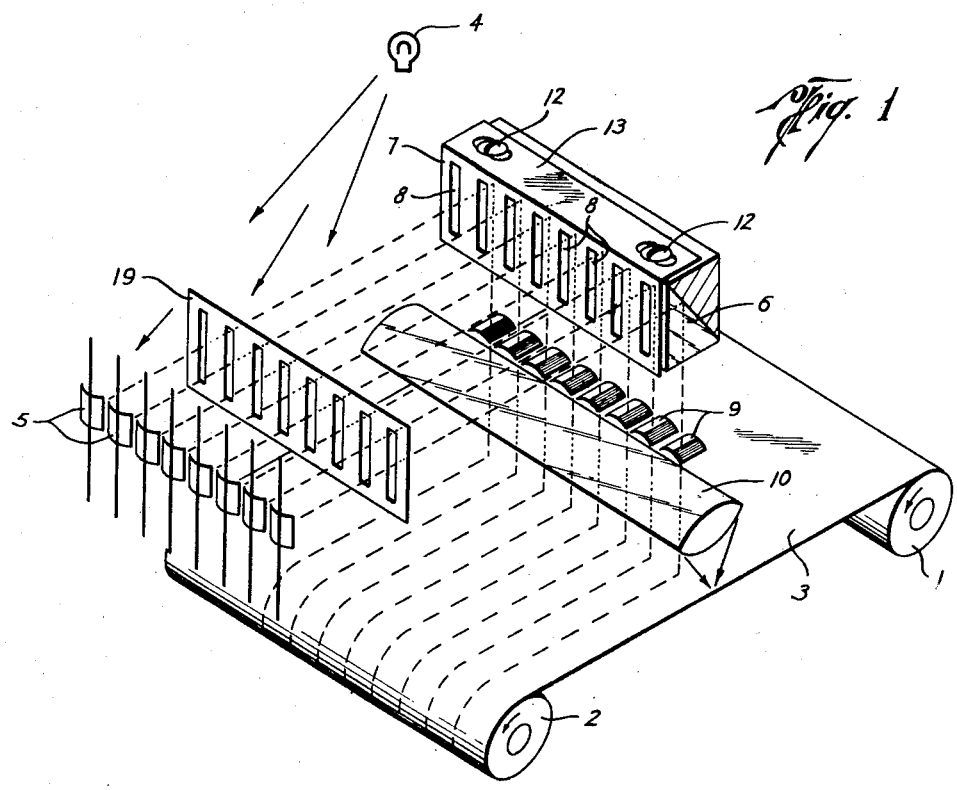

Feb. 24, 1959

V. T. REYNOLDS 2,875,017

VIBRATION RECORDING DEVICE

Filed Nov. 25, 1953

Vining T. Reynolds
INVENTOR.

BY
ATTORNEYS

United States Patent Office 2,875,017
Patented Feb. 24, 1959

2,875,017

VIBRATION RECORDING DEVICE

Vining T. Reynolds, Houston, Tex., assignor, by direct and mesne assignments, to Southwestern Industrial Electronics Company, a corporation of Delaware Application November 25, 1953, Serial No. 394,323

1 Claim. (Cl. 346—109)

This invention relates to vibration recording machines and more particularly to an improved device especially adapted for use in seismic exploration work.

In prospecting for oil, sulphur, and the like, and for eliminating much guess work preparatory to the costly drilling of a well, seismic equipment is often employed for determining the character of underground formations. One method is to set off a dynamite charge in a shot hole below the surface and in centered relation to two groups of radially spaced apart pickup phones or detectors from which vibrations returning serially from the several different successive layers of earth formation, are telegraphed through an amplifier to a recording apparatus. A well known recording apparatus is a camera having a traveling light-sensitive film to receive a series of light beams from a bank of oscillographs. With one oscillograph for each detector of the two groups, the response to tremors picked up will oscillate each light beam in relation to tremor intensity and the several beams reaching the traveling light-sensitive film will mark side by side wave outlines or images on the film. The set of continuous wave lines are in accord with surface disturbance at the several spaced apart detector locations and rebounds from each of progressively deeper formation layers or changes. Concurrently, a timing shutter controls flashes and interruptions of a light beam to the film for recording by spaced transverse lines, successive given time intervals in relation to rate of film travel to show measurement between the explosion and responses picked up at the detectors or reception stations. Thereafter, the film is developed and forwarded to a skilled technician who mathematically and otherwise laboriously calculates and interprets the recorded wave profiles and deduces the types, thicknesses, densities, directions, and other characteristics of the successive layers and pools to the depth reached in the test. The result affords a guide to the oil industry as to whether and where to begin a drilling operation.

The mechanics for running a test are relatively simple, but the interpretation of the multiple wave record requires much time and accurate care by an engineering specialist. It is now proposed to simplify the procedure and provide a record which can be interpreted mechanically and quickly, and, if desired, at the test location. For that purpose a modified type of camera has been devised for recording vibrations in straight line codes as distinguished from wave line patterns, and which record may then be decoded in a photographic process by a second camera machine having a light sensitive film to receive light from a source scanning the tracks of the first record. Mechanism incorporated in the decoding machine automatically correlates frequency and amplitude and corrects or compensates for several variables contained in the first film, such variables including among others, misalignments caused by different distances, both horizontally and vertically, between locations of the several pickup detectors and which introduce lags as detector stations spread farther from the shot hole. A machine for reproducing the trace patterns in readily readable, corrected form is disclosed in copending application Serial No. 436,302, filed June 14, 1954.

The present subject matter deals with the camera for producing the initial record to be later compensated and decoded or mechanically interpreted. It is an object of the invention to provide a device which modifies the existing or conventional oscillograph-traveling film camera so as to record an oscillating light beam as a straight line pattern by blanking out the light beam sweeping beyond a selected angular zone in the range of beam oscillation and to gather light rays projected within the open passage zone through a lens system which focuses the passed light rays to a point on the film surface. By this arrangement the projected beam passing to the traveling light sensitive film shows up on the film as a straight line and the blanked out beam which has moved beyond the light transmitting passage and fails to reach the film, is shown by a break or gap on the recorded line. Thus gap length is a time measurement of light beam oscillation beyond the light transmitting passage, and, therefore, in relation to recorded frequency, indicates amplitude of the vibration to which the oscillograph responded. With each oscillograph responding to a different detector of a group on both sides of the shot hole, there will be recorded in parallel, a corresponding number of straight lines containing gaps. The gaps in neighboring lines can be correlated with respect to detector spacing and, therefore, spacing between the several bounce points along a range of length at each subsurface layer and the successive gaps in each length of line are reflective of earth formations encountered at descending layers.

A further object of the invention is to improve the ease of reading a record by completely blanking out all of the light beam oscillations which lie on one side of a mean position or center of the range of oscillation, as for example, by shielding the film from all light which in the conventional camera equipment defines wave troughs. Thus for receiving beam oscillation of amplitudes which carry the light beam beyond the light transmitting passage to the film, the developed film will show in succession a long gap representative of a trough, a dash as the light beam swings through the passage zone, a shorter gap as the beam swings to the crest and returns to the light passage zone and then another dash as the beam crosses the passage zone and again a long gap representing a trough and so on. For subsequent interpretation the long gaps or trough areas stand out and help set apart the shorter line breaks whose lengths are to be indicative of crest amplitude. Vibration frequency can be gaged conveniently by the distance separating either the start or the end points of the succeeding troughs or long gaps. The final interpretation will relate line frequency distances and gap lengths for determination of frequency and amplitude and yield a reading of substrata formations.

Figure 2:
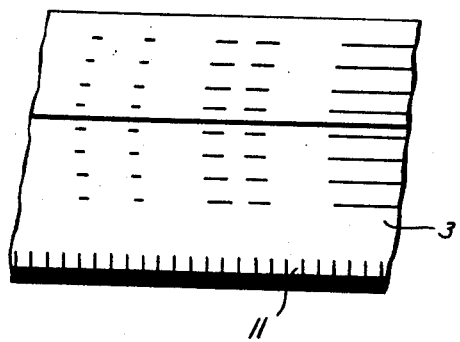

For a better explanation of the invention, reference is made to the accompanying drawing wherein Fig. 1 is a perspective view illustrating in a simplified fashion the parts and their relation in a camera for seismic exploration and Fig. 2 illustrates a film record with types of interrupted straight line markings to be interpreted.

A commercial seismic record camera may be readily modified for embodiment of the present invention and the drawing illustrates those standard parts and co-operating additions which contribute to the desired result. The mechanism may be operated in a dark room but ordinarily is enclosed within a light excluding container.

Included as part of a conventional camera are a pair of spaced reels such as an unwinding roll 1 and a winding roll 2 to which the opposite ends of a flexible strip 3 are secured with the strip extending between the rolls for travel from the unwinding roll 1 to the winding roll 2. A spring motor or the like is connected to the winding roll to drive the same. The flexible strip 3 of suitable width carries on its surface a light sensitive or photographic film for exposure to a series of light beams. The light beams originate from a light source or electric bulb 4 and a bank of oscillatory mirrors 5—5, constituting parts of oscillographs, reflect light rays in a series of beams projecting toward the light sensitized film.

For compactness of assembly a reflecting prism 6 is interposed between the bank of oscillographs and the film for reflecting the light beams toward the film at right angles to the direction of the oscillograph reflected rays. The conventional oscillograph is a galvanometer unit for oscillating a very small mirror upon receiving current through an amplifier and in response to vibration detectors or pickup phones. Any number of detectors can be employed and they usually are arranged in two groups extending on both sides of the shot hole and in given equal spaced apart relation.

A set of eight oscillographs is illustrated in the drawing and it will be understood that relative oscillations follow in amplitude and frequency the response at the detectors to return waves set off at the shot hole. Each reflects light from the source 4, past the prism and to the film surface. Each light beam, in the absence of oscillation, will reach the film as a point and, as the film travels, a straight line will be recorded. With the camera as heretofore constructed mirror oscillation to the right or left swings the beam so that the spot of light on the film moves in a continuous zig-zag and the traveling film records the image in wave profile in relation to frequency and amplitude of the seismic vibration. At the same time a revolving shutter allows a beam of light to be periodically projected to the film and marks spaced transverse line time intervals either entirely across the face of the film or optionally in a band along one edge.

As distinguished from a wave profile as heretofore recorded, a few additional parts properly related to one another will record the light beam as a straight line but with interruptions in the straight line to indicate light beam oscillation and the size of the interruption or gap in the line will afford a measurement of the angle of light beam oscillation. These few additional parts, in accordance with a preferred embodiment illustrated, include a shield 7 having a series of spaced apart light transmitting slits 8—8 mounted on the face of the prism 6 through which the beam enters; a slotted shield 19 spaced ahead of the shield 7 and reasonably close to the oscillograph mirrors 5 and a focusing lens system in the space between the prism and the film surface.

As shown, the lens system includes a row of small cylindrical meniscoid or converging concavo-convex lenses 9—9, one in each beam path, and a single cylindrical double convex lens 10 which extends in tandem to the lenses 9 across paths of all the light beams, with its axis of curvature at right angles to the axes of curvatures of the lenses 9, the latter axes all being in a single plane and parallel to one another. The relation of the lenses 9 and 10 is selected so that all light rays of a given beam passing through the tandem lenses will converge to a point at the film surface. The spacing of these parts will necessarily be such that the film surface is at the focus of the lens system. All the light gathered at each concavo-convex lens 9 will converge toward a line parallel to the lens cylindrical axis and those light rays so condensed, upon passing through the double convex cylindrical lens 10 will then be converged or carried to the focal point on the film surface for establishing the film record. Other types of lens systems may be substituted to accomplish the purpose, but that shown has beeen selected as being economically feasible since the lenses as proposed are standard types readily available without special grinding.

An important feature concerns the light which is allowed to reach the traveling film and is controlled by the arrangement of the light transmitting passages 8 in the shield 7. It will be readily apparent that if the width of a slit 8 is of a dimension smaller than the range of maximum sweep of the oscillating beam at the shield location, then the light beam will be blanked out when it moves beyond the slit 8. Thus reflected light is transmitted through the shield and to the traveling film only when the projected beam is in alignment with the light transmitting passage. Consequently, an oscillating light beam sweeping through and away from the slit will produce a photographic record of a straight line containing a blank or gap whose measurement shows the swing of the beam away from the slot and return back to the slot. By co-relation with time interval and frequency markings on the film the amplitude of the oscillation is indicated.

The slit 8 should be narrow so that it passes the light beam only in a small angle of its oscillation. One side of this angle is located at or immediately adjacent the mean of the oscillatory range by locating one edge of the slit 8 in alignment with the mean. All light rays on one side of mean are blanked out. With the light transmitting passageway lying wholly to the opposite side of mean and being of a predetermined width to exclude or blank out light ray passage to the film when the beam swings beyond a given angle, the light beam can only reach the film when it is within the limits of the selected angle as determined by the width of the slot 8. Thus with the slotted shield 7 to intercept light rays and with the lens focusing the rays which pass the shield, it will be apparent that the traveling light sensitive film 3 will show a continuous straight line when there is an absence of oscillation and it will show spaced dashes when there is oscillation from and back to the light passing angle, with the dashes arranged in spaced pairs. The spacing between the pairs of dashes results from blanking out all the light to one side of mean of the oscillating beam and the distance or space between dashes of each pair indicates how long the beam was outside the selected angle and was blanked out on the opposite side of mean.

For a better understanding of the type of record which is produced, reference is made to Fig. 2, which may be considered as illustrative of the type of markings that are photographically produced. In this figure a series of scale lines along the lower edge 11 of the film 3 were produced by a timing shutter during film movement. A continuous longitudinal center line is not necessarily made on the film, but is shown as indicative of shot location and the parallel lines above and below indicate vibrations picked up at spaced locations on both sides of the shot. Considering the vibration record lines and beginning at the right hand of Fig. 2, the vertical group of continuous unbroken straight lines indicate that all eight beams of light were projected continuously onto the film as occurs when there is no oscillation. Immediately on the left of the group of unbroken lines there is a long gap or break in line continuity to indicate a blanking out of all light beams in their swing to one side of mean, comparable to trough portions of conventional wave profile records. Following the line gap there are shown a vertical group of dashes arranged as a pair in each line which indicates that the light beams swung back through the slits 8 and into crests whose overall angles exceeded the angles defined by the slits. Each light beam was projected through its slit on the way to the top of the crest and again on its return to mean. Following this group of dashes is another group of long blanks or breaks in the lines for the following troughs and then again there are pairs of spaced dashes showing the beams traversed crests. Troughs are indicated by blanks at the left hand edge of the film. The two groups of pairs of dashes are shown for purposes of comparison, it being noted that in one case the gaps between the paired dashes in a transverse group differ in length from the breaks between the other pairs shown. The greater gap indicates a greater swing of the light beam beyond the selected angle for light transmission. Vertical misalignment of line terminations is due to relative location spacing of detectors from the shot hole, and consequently, the differences of shock travel distance.

For convenience of manufacture, all the slits 8 are formed in one piece of light gage sheet metal or other opaque material to constitute the shield 7. The location of the slits so that one edge of each is in alignment with the mean position of a given mirror must be accurately taken care of so that the group of slits are properly related to the group of mirrors. Then the shield 7 can be adjustably mounted over the prism face, as for example by a pair of clamp screws 12—12 extending through transversely elongated slots in the mounting flange 13 of the shield.

The slitted shield 19 in advance of the shield 7 cooperates therewith in that it blanks out light beams at extremes in the ranges of oscillation. A beam projected to a given slit 8 has no chance of overlapping and reaching an adjacent neighboring slit 8. This enables the slits 8 to be closely spaced apart and also it allows the oscillographs of the bank to be positioned in close side by side relation for compactness of the assembly. For the same reason, the shield 7 is positioned as shown, although if compactness of assembly were no factor, it could be located for example directly in advance of the lens system. With total blanking of the light on one side of its mean of oscillation it follows that only half of each lens 9 is needed. The remaining half could be blanked out or omitted. Such omission, either by cutting a commercially available lens in half or by specially forming a lens is deemed economically unfeasible.

While but a single embodiment of the invention has been shown, it is to be understood that the invention is capable of modifications such as come within the scope of the appended claim.

What is claimed is:

In a seismograph camera of the character described, a bank of vibration responsive oscillatory light reflectors to project a series of narrow light beams, an adjustably mounted shield having light passing slits, one for each reflector, arranged to confine beam passage to a selected angle of beam oscillation, a second slitted shield interposed between the reflectors and the first shield to preclude projection of each beam to other than an intended slit in the adjustably mounted shield, a series of converging cylindrical concavo-convex lenses to receive light beams passing through said slits to gather and condense the respective beams to spaced parallel lines, a converging cylindrical double convex lens whose axis of curvature is normal to those of said concavo-convex lenses, positioned to focus the previously condensed beams to transversely spaced points and a traveling light sensitive film presenting a traveling surface at said focal points for recording in side by side parallelism the slitted passage and shielded interception of the several beams in dash and gap succession linearly of film travel.

References Cited in the file of this patent

UNITED STATES PATENTS

| | | |
|---|---|---|
| 2,196,735 | McSeod et al. | Apr. 9, 1940 |
| 2,238,734 | Hullegard | Apr. 15, 1941 |
| 2,467,950 | Thompson | Apr. 19, 1949 |
| 2,490,461 | McKinney | Dec. 6, 1949 |
| 2,540,626 | Maurer | Feb. 6, 1951 |
| 2,710,070 | Merten | June 7, 1955 |
| 2,726,131 | Skelton | Dec. 6, 1955 |
| 2,791,288 | Meier | May 7, 1957 |